April 2, 1968

V. REINSTEIN, JR 3,376,243

BLAST FURNACE CHARGER CONSTRUCTION

Filed April 20, 1965

INVENTOR.
Victor Reinstein, Jr.
BY
Joseph P. Gastel
ATTORNEY.

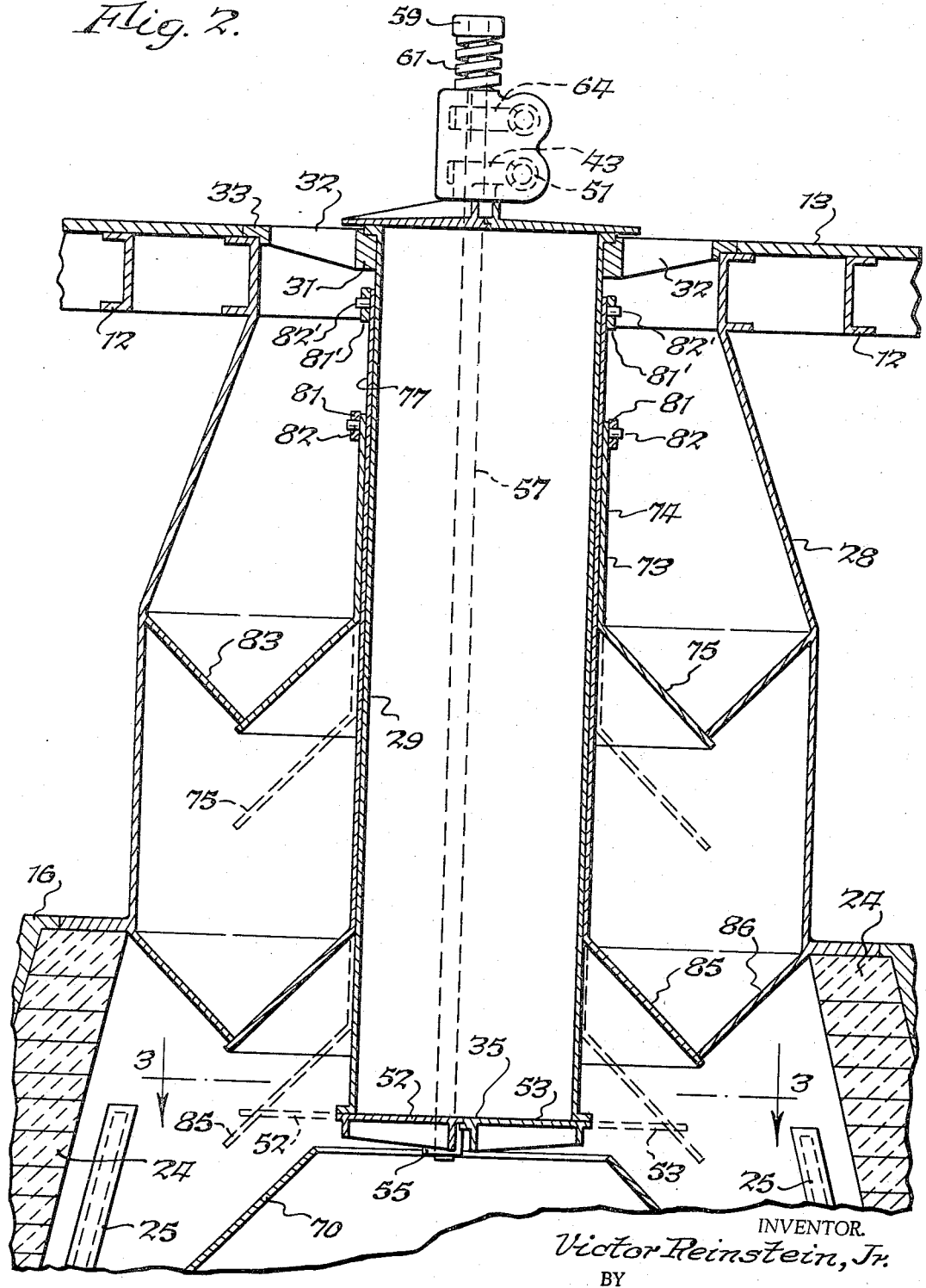

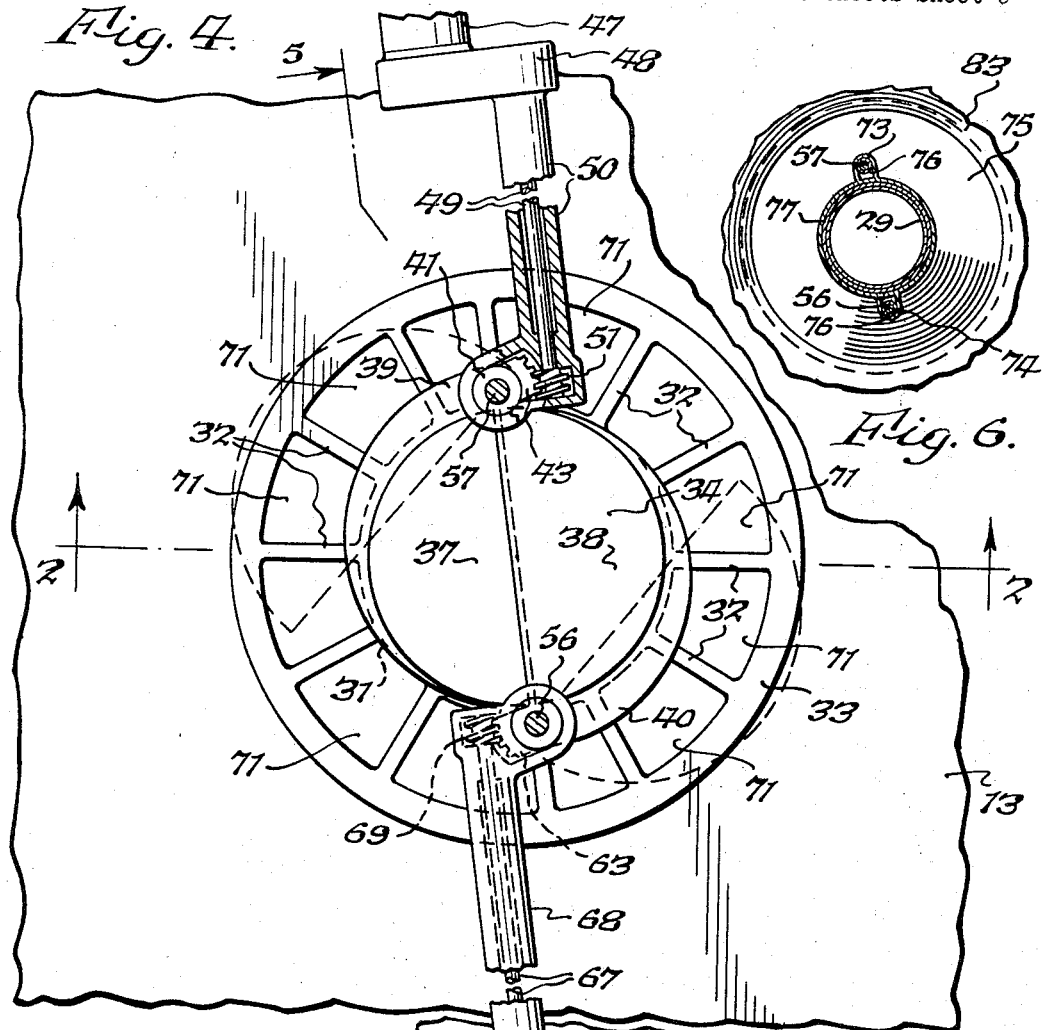

April 2, 1968  V. REINSTEIN, JR  3,376,243
BLAST FURNACE CHARGER CONSTRUCTION
Filed April 20, 1965  4 Sheets-Sheet 4

INVENTOR.
Victor Reinstein, Jr.
BY
Joseph P. Gartel
ATTORNEY.

United States Patent Office 3,376,243
Patented Apr. 2, 1968

3,376,243
BLAST FURNACE CHARGER CONSTRUCTION
Victor Reinstein, Jr., 39 Bellevue Blvd.,
Cheektowaga, N.Y. 14225
Filed Apr. 20, 1965, Ser. No. 449,424
11 Claims. (Cl. 266—27)

ABSTRACT OF THE DISCLOSURE

A blast furnace construction having an outer shell, a refractory liner in the outer shell, a central charging chute at the top of the furnace for large scrap, a bell construction coaxial with the central chute for delivering small charge material to the furnace, a water-cooled skirt for protecting the refractory at the upper portion of the furnace from bouncing large scrap, and a deflector proximate the skirt for both deflecting the small charge into a banked condition against the side of the furnace and for deflecting bouncing large scrap away from the water-cooled skirt.

---

The present invention relates to an improved blast furnace construction.

In the past, the conventional blast furnaces were capable of receiving a charge of small scrap, ore, coke and limestone which had been comminuted to the proper sizes. However, large scrap such as compressed automobiles and truck bodies could be used only in open hearth furnaces which had relatively high fuel and labour costs and in addition, utilized large amounts of liquid and gaseous hydrocarbons which could more reasonably be used by society as automobile fuel and for residential heating purposes. In addition, blast furnaces and open hearth furnaces were required for different types of charges. With the adaption of the blast furnace of the present invention, the relatively high equipment investment of open hearth furnaces can be eliminated.

It is accordingly the primary object of the present invention to provide an improved blast furnace construction which eliminates the use of petroleum and gaseous fuels in the steel industry to thereby conserve such liquid and gaseous hydrocarbons for utilization as automobile fuels and for residential heating.

It is another object of the present invention to provide an improved blast furnace construction which is capable of utilizing either the conventional charge of small scrap, ore, coke and limestone, or which can selectively also utilize large scrap, such as compressed truck and automobile bodies and the like, thereby obviating the need for open hearth furnaces. A related object of the present invention is to provide a blast furnace construction which is capable of enabling large scrap to be processed directly into liquid pig iron at the blast furnace stage of steel manufacture. A further related object of the present invention is to provide an improved blast furnace construction which, by utilizing either the conventional charge of small scrap, ore, coke and limestone or large scrap mixed with the conventional charge can result in positive cost reductions in the finished steel product because the large scrap or ore can be used as the ferrous part of the charge, depending on whichever has a cheaper market price at the time. Still another related object of the present invention is to provide a blast furnace construction which eliminates the investment in and the labour attendant to the use of open hearth furnaces. Other objects and attendant advantages of the present invention will be readily perceived hereafter.

The present invention relates to an improved blast furnace construction which is capable of utilizing a conventional charge of comminuted small scrap, coke, ore and limestone or a charge of large scrap, coke, ore and limestone. To this end, the blast furnace includes an outer frame, an outer shell supported by said outer frame, a refractory lining within said outer shell, a water cooled skirt located at the upper portion of said furnace proximate said refractory lining, first support means extending from said frame through said outer shell and said refractory lining for supporting said water cooled skirt, and a charging assembly located above said water cooled skirt for supplying a charge to said furnace, said charge being the conventional one normally used in a blast furnace or including large scrap. The water cooled skirt prevents breakage of the frangible refractory by absorbing the shock of the large scrap in the event it tends to bounce against the sides of the furnace. The charging assembly consists essentially of a central large scrap chute which is capable of conducting large scrap to the furnace, said large scrap chute having upper and lower doors which may be opened alternately to permit the deposit of the large scrap into the furnace without attendant excessive loss of hot gases. In addition, surrounding the central large scrap chute, a bell construction is provided for depositing the conventional charge into the furnace, the bell construction including upper and lower bells which are alternately openable to permit the charge to be deposited without the attendant loss of hot gases from the furnace. In addition, a deflector shield is provided in underlying relationship to both the central large scrap chute and the bells. This deflector shield serves the dual purpose of tending to prevent the large scrap from bouncing against the water cooled skirt and also deflecting the conventional charge as it falls so that it tends to bank against the sides of the furnace to protect the refractory from abrasion by large scrap as the latter moves downwardly during furnace operation. The present invention will be more fully understood when the following portions of the specification are read in conjunction with the accompanying drawings wherein:

FIGURE 2 is a cross sectional view taken substantially along line 2—2 of FIGURE 4 and showing the various details of the charging assembly, with certain portions of the furnace omitted in the interest of clarity;

FIGURE 3 is a cross sectional view taken substantially along line 3—3 of FIGURE 2 and showing the manner in which the lower chute doors operate;

FIGURE 4 is a view taken substantially along line 4—4 of FIGURE 5 for the purpose of showing the drives to the upper and lower doors associated with the central chute;

FIGURE 6 is a view along line 6—6 of FIGURE 5.

Figure 1:
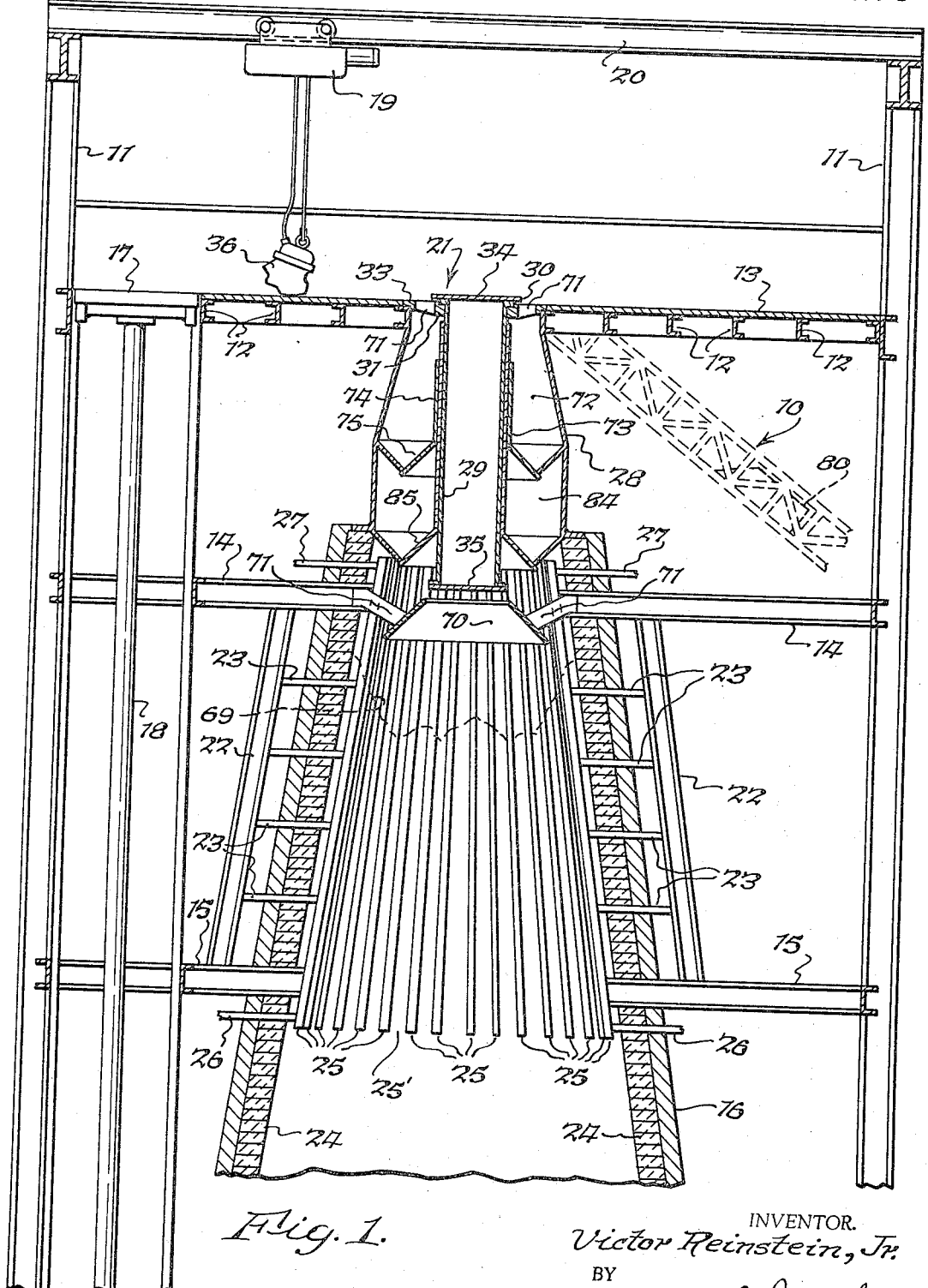
FIGURE 1 is an elevational view, partially in cross section, of the improved blast furnace construction of the present invention.

The improved blast furnace construction 10 shown in FIGURE 1 includes a framework including columns 11 and beams 12 supporting floor 13. The framework also includes beams 14 and 15 which support various parts of the protective skirt 25' to be described hereafter. This framework is placed in a foundation of cement or the like which also supports shell 16. The portion of the blast furnace housed within shell 16, which is below the portion shown in FIGURE 1 is conventional in the art and therefore has been omitted. In other words, the novelty of the present invention resides in the combination of the framework surrounding the shell 16 in conjunction with the novel loading structure which permits the use of large scrap.

An elevator platform 17 is driven by piston 18 which has its lower ends in communication with an hydraulic cylinder or the like for moving piston 18 upwardly and downwardly. Platform 17 carries large scarp up to floor 13. A moving crane 19 mounted on beam 20 is utilized to carry the large scrap to the charging assembly 21 which will be described in greater detail hereafter. In lieu of the hydraulic elevator, any other suitable type of elevator may be utilized.

As noted above, the improved blast furnace of the present invention is capable of utilizing a conventional comminuted charge of small scrap, limestone, coke and ore, or if desired may also use large scrap such as crushed compressed automobile bodies or the like. Because it can utilize such large scrap the necessity for open hearth furnaces, which were previously the only type which could handle such large scrap, has been obviated with the attendant saving in fuel and labor costs incidental to the operation of open hearth furnaces. In addition, the high liquid and gaseous hydrocarbon consumption associated with open hearth furnaces is obviated. Furthermore, as noted above by virtue of the fact that the improved blast furnace of the present invention can utilize either large scrap or conventional comminuted charges of small scrap, coke, limestone and ore, the steel producers can utilize whicever is cheapest at any particular time thereby taking advantage of fluctuations in market prices to their advantage.

As is shown in FIGURE 1, beams 14 and 15 have columns 22 extending therebetween which in turn have struts 23 extending therefrom. Struts 23, in turn, extend through shell 16 of the furnace and through refractory lining 24 within shell 16. Struts 23 in turn support conduits 25 which are arranged in a frusto-conical pattern, in essence paralleling the configuration of the refractory 24 and shell 16. Water inlet conduits 26 are associated with each of conduits 25 for conducting cooling water thereto and water outlet conduits 27 are associated with each of conduits 25 for conducting cooling water therefrom. Conduits 26 may be fed from a suitable cooling water manifold not shown and conduits 27 may lead to a suitable water manifold not shown. Any other suitable arrangement may be provided for conducting cooling water to conduits 25 which by virtue of their orientation form a water cooled skirt 25'. The function of the water-cooled skirt 25' is to prevent a body charged as large scrap from bounding and striking the frangible refractory lining 24 to thereby avoid its breakage.

The furnace is loaded through an improved charging assembly 21. More specifically, as can be seen from the various figures, a central cylindrical large scrap chute 29 has its upper rim 30 resting on rim 31 (FIG. 1) joined to the rest of floor 13 by radial arms 32 (FIG. 4) terminating in ring 33. Suitable braces, not shown, may be added to strengthen the foregoing construction. The central chute is substantially cylindrical in configuration and includes a top door 34 and a bottom door 35.

Figure 5:
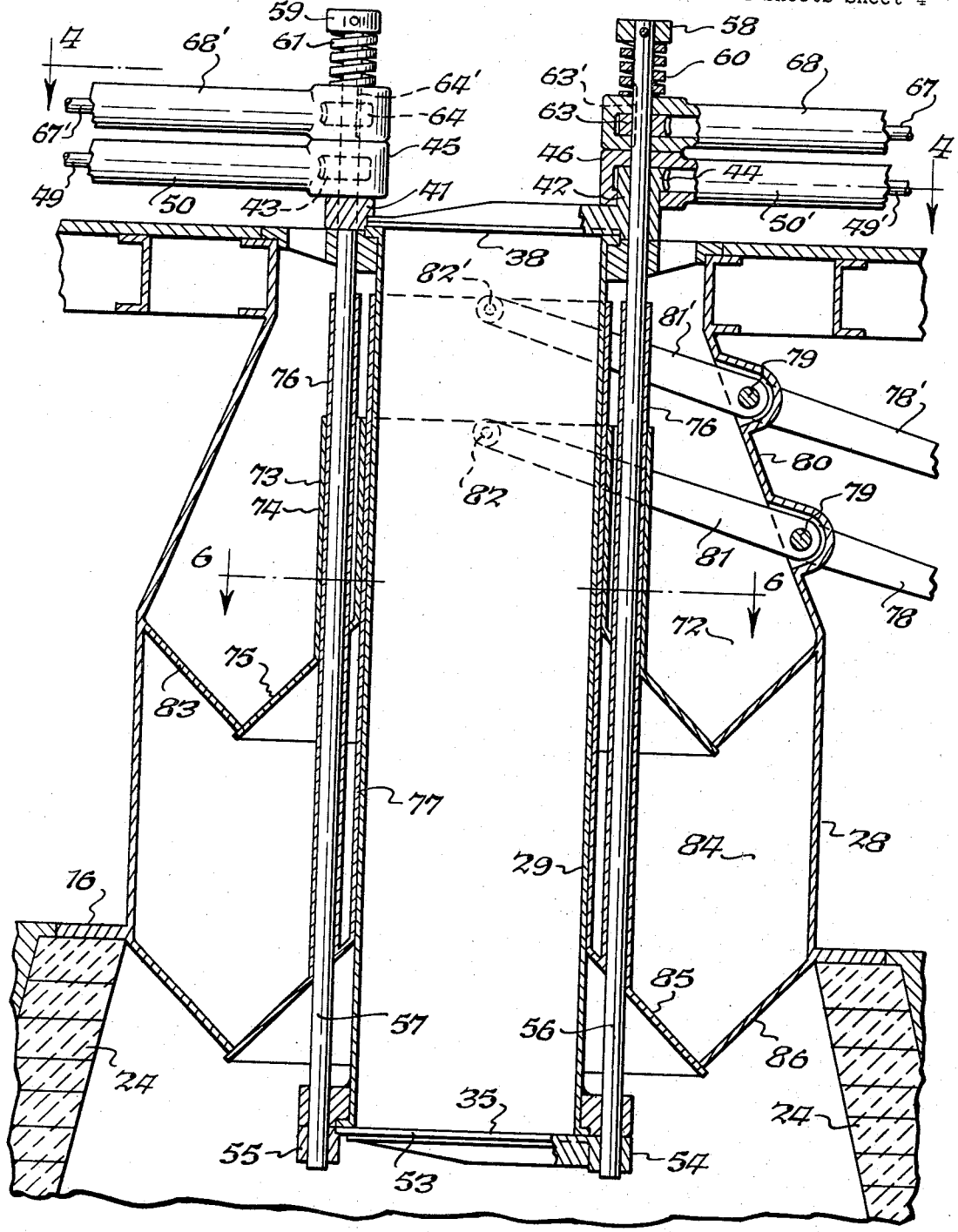
FIGURE 5 is a view taken substantially along line 5—5 of FIGURE 4 and showing in greater detail the door actuating mechanism associated with the doors in the large scrap chute and the actuating mechanism for the upper and lower bells.

Large scrap 36 is loaded into the furnace through chute 29 without losses of any great amounts of heat. It is merely necessary to carry large scrap 36 with crane 19 to a position overlying upper door 34 which is opened while the lower doors 35 remain closed to prevent loss of heat. Door 34 consists of two plate-like halves 37 and 38 (FIG. 4) each being of generally semi-circular shape. The ends 39 and 40 of plates 37 and 38, respectively, are securely fixed to collars 41 and 42, respectively (FIG. 5), which in turn are rigidly secured to gear segments 43 and 44, respectively, mounted in housings 45 and 46, respectively. A motor 47 having gear reducer 48 coupled thereto transmits motion to drive shaft 49 within housing 50. A similar arrangement (motor not shown) is provided for driving shaft 49' housed within housing 50'. Shaft 49 terminates in worm 51 which is in mesh with gear 43. A similar worm (not shown) is at the end of shaft 49'. The motors which drive shafts 49 and 49' may be identical notwithstanding that only one is shown. Whenever shafts 49' and 49 are rotated the worms at the ends of said shafts are rotated to cause gears 43 and 44 to rotate and carry doors 37 and 38 to an open position.

After doors 37 and 38 are opened, the large scrap 36 may be lowered by the crane into chute 29 and it is placed on closed bottom doors 52 and 53 which are essentially of semicircular configuration. Thereafter upper doors 37 and 38 are closed. It is to be noted that door 53 has an end secured to collar 54 and door 52 has an end secured to collar 55 which in turn are rigidly secured to shafts 56 and 57, respectively, extending upwardly toward the top of the furnace and having collars 58 and 59, respectively (FIG. 5), secured at the tops thereof. Compression springs 60 and 61 encircle shafts 56 and 57, respectively, for the purpose of absorbing any shock which might result if the large scrap were to drop onto doors 52 and 53 due to improper loading and this will permit them to yield downwardly under such impact. At this point it is to be noted that there are sliding connections between shaft 56 and gear segments 44 and 63 and between shaft 57 and gear segments 43 and 64. Gear segments 43 and 44 may rotate relative to shafts 57 and 56, respectively. Gear segments 63 and 64 are splined at 63' and 64', respectively to shafts 56 and 57 to prevent relative rotation but permit relative longitudinal movement. Gear segment 63 is driven from motor 65 through gear reducer 66 and shaft 67 mounted within housing 68 and having worm 69 affixed to the end thereof (FIG. 4). A similar drive arrangement with a motor (not shown) drives shaft 67' housed in housing 68'. Shaft 67' drives gear 64, which as noted above, is splined to shaft 57. Whenever motor 65 and its counterpart are energized doors 52 and 53 will open to permit the large scrap to drop into the inside of the furnace. It will be appreciated that the upper doors 37–38 are closed when the lower doors are opened to prevent loss of heat through chute 29.

It can be seen from FIGURE 1 that the top of the contents within the furnace generally follows the contour shown by dotted line 69 so that a cavity is formed for receiving the large scrap deposited in the foregoing manner. Generally the large scrap 36 will settle into the above noted cavity. However, in the event that it bounces laterally above the contents of the furnace it may strike water cooled skirt 25'. However, this water cooled skirt 25' is intended to absorb such shock and thus protect the refractory lining 24. Furthermore, if the large scrap 36 bounds up too high, it will enter frusto-conical deflector shield 70 which is supported from beams 14 by brackets 71'. Beams 14, 15 and 22 are present in sufficient number to provide rigid support to conduits 25. Deflector shield 70 serves as an added safeguard against damage to conduits 25, in addition to serving other functions, as will be described hereafter. The temperature in the region of deflector shield 70 is between 300° F. and 600° F. and therefore it does not need artifical cooling as do conduits 25 which may be 18 to 20 feet long and therefore extend downwardly into the hotter parts of the furnace.

The conventional charge or burden of small scrap, coke, ore and limestone is dumped into the furnace through openings 71 within rim 33 (FIG. 4). This conventional charge or burden is dropped into chamber 72 surrounding upper bell 73 having an upper substantially cylindrical portion 74 and a lower inclined frusto-conical portion 75. It is to be noted from FIG. 6, however, that portion 74 departs from exact cylindrical shape to accommodate sleeves 76 forming a part of lower bell 77. A forked lever 78 has a central portion pivoted on pin 79 locating on upper housing 80. The ends 81 of lever 78 are mounted on pins 82 (FIG. 2) extending from portion 74 of bell 73. A motor and suitable linkage (not shown) are attached to the end of lever 78 and when this lever pivots in a counterclockwise direction in FIGURE 5, the upper bell will move downwardly, as guided by sleeves 76 and the outside 77 of the lower bell so as to cause the inclined portion 75 thereof to move away from plate 83 and thus permit material within chamber 72 to drop into chamber 84 and land on inclined surface 85 and plate 86 of lower bell 77. Thereafter lever 78 is pivoted in a clockwise direction to cause lower bell 73 to return to the position shown in FIGURE 5. Thereafter, the conventional charge is dropped into the furnace by lowering of lower bell 77 and thus causing its lower inclined portion 85 to move away from inclined plate 86. This is effected by pivoting lever 78' in a counterclockwise direction about pivot 79' by use of a suitable motor and linkage (not shown) coupled to said lever. The ends 81' of lever 78' are forked and pivot on pins 82' extending from upper bell 77. Suitable lost motion connections may be provided. It is to be noted that tubular members 76 will be guided for rectilinear movement because they slide on shafts or rods 56 and 57 and, further, the cylindrical portion 77 slides on the outside of the cylindrical central chute 29. The conventional charge will drop on the outside of frusto-conical shell 70 and thus be deflected against the outside of the furnace up against the refractory 24 to provide the banking pattern 69 shown in FIGURE 1. Thereafter the lower bell is closed. It is to be especially noted that the lower bell and upper bell are opened alternately to thereby prevent the escape of excessive heat from the furnace. In lieu of the above-described bell operating mechanism suitable cables may be used.

It is to be noted that the large scrap chute 29 is approximately 12 feet in diameter and the diameter across openings 71 is approximately 18 feet thus making openings 71 have a radial dimension of approximately 3 feet each.

As can be seen from the schematic representation in FIGURE 1, a conveyor 80, which may be a belt conveyor or a skip car arrangement is provided for carrying the conventional charge of small scrap ore, coke or limestone to a level approximately even with floor 13 so that it may be loaded into the furnace through openings 71.

An alternate arrangement for charging large scrap would be to continue chute 29 past a trap door located at the position of door 35. The chute from this point downwardly would flare outwardly as it continued downwardly for a distance of 18 or 20 feet. This portion of the chute would contain water cooling conduits.

It can thus be seen that the improved blast furnace construction of the present invention is manifestly capable of achieving the above enumerated objects and while preferred embodiments of the present invention has been disclosed, it will be understood that the present invention is not limited thereto but may be otherwise embodied.

I claim:

1. A blast furnace construction comprising an outer frame, an outer shell, a refractory lining within said outer shell, first support means carried by said frame and extending through said outer shell and said refractory lining, a water cooled skirt located within said refractory lining and supported by said first support means, a deflector shield located within said water cooled skirt, second support means carried by said frame for supporting said deflector shield, and a charging assembly located above said deflector shield and said water cooled skirt for supplying the charge to said blast furnace.

2. A blast furnace construction as set forth in claim 1 wherein said charging assembly includes upper and lower bell means, means for alternately opening said upper and lower bell means to permit a charge to be supplied to said furnace, and a tubular large scrap chute coaxially mounted relative to said upper and lower bell means and supported by said framework for permitting large scrap to be supplied to the inside of said furnace, said deflector shield preventing said large scrap from bounding upwardly against an uppermost portion of said water cooled skirt, and said water cooled skirt preventing said large scrap from bounding against refractory lining.

3. A blast furnace construction as set forth in claim 2 wherein said central chute includes alternately openable upper and lower door means for permitting said large scrap to be loaded into said furnace through said chute without permitting excessive amounts of hot gases from being released from the inside of said furnace.

4. A blast furnace construction as set forth in claim 3 wherein said lower door means includes a resilient mounting for minimizing breakage due to the shock of said large scrap dropping onto said lower door means.

5. A blast furnace construction as set forth in claim 4 including means for conveying said large scrap to the top of said furnace.

6. A blast furnace construction as set forth in claim 5 including means for carrying said charge to the top of said furnace.

7. A blast furnace construction comprising an outer shell, a refractory lining within said outer shell, a water cooled skirt located within and proximate to the upper portion of said refractory lining, chute means at the upper portion of said furnace for charging large scrap substantially centrally into said furnace, bell means mounted substantially coaxially with respect to said chute means and including an upper bell means and a lower bell means for permitting small charge to be fed to said furnace without permitting substantial escape of gases from said furnace, and a deflector chute located substantially coaxially with said central chute and said upper and lower bell means for protecting the upper portion of said water cooled skirt from large scrap bouncing upwardly thereon and for causing said small charge to be deflected after falling from said lower bell and to be banked against said water cooled skirt, thereby providing a depression for receiving large scrap falling through said chute.

8. A blast furnace construction comprising an outer shell, a refractory liner within said outer shell, skirt means located within and proximate to the upper portion of said refractory lining, first means at the upper portion of said furnace for charging large scrap into said furnace, second means at the upper portion of said furnace for charging small charge into said furnace, deflector means located proximate said skirt means for protecting said skirt means from damage by large scrap bouncing upwardly after entering said furnace through said first means, said deflector means comprising a chute having an upper opening and a lower opening in alignment with said first means for permitting said large scrap to fall therethrough.

9. A blast furnace as set forth in claim 8 wherein said deflector means includes wall means in alignment with said second means for banking small scrap along the side of said furnace.

10. A blast furnace construction comprising an outer shell, a refractory lining within said outer shell, a large scrap chute located at the upper portion of said shell, support means for holding said chute in predetermined relationship relative to said shell, small charge charging means located proximate to said large scrap chute including a bell assembly having upper and lower bells located substantially coaxially with said large scrap chute, and means for alternately opening and closing said upper and lower bells to permit said small charge to be supplied to the inside of said furnace.

11. A blast furnace as set forth in claim 10 wherein said central chute includes alternately openable upper and lower door means for permitting said large scrap to be loaded into said furnace through said chute without permitting excessive amounts of hot gases to be released from the inside of said furnace.

References Cited

UNITED STATES PATENTS

| | | | |
|---|---|---|---|
| 2,671,658 | 3/1954 | Moore | 266—32 |
| 2,805,851 | 9/1957 | Becker et al. | 266—32 |
| 2,814,478 | 11/1957 | Van Loon | 214—36 X |
| 3,202,407 | 8/1965 | Slagley et al. | 214—36 X |
| 3,297,432 | 1/1967 | Mohr | 266—27 X |

J. SPENCER OVERHOLSER, *Primary Examiner.*

E. MAR, *Assistant Examiner.*